Sept. 4, 1956 H. H. KREIDEL 2,761,705
PIPE COUPLING AND GASKET RING THEREFOR
Filed Aug. 29, 1952
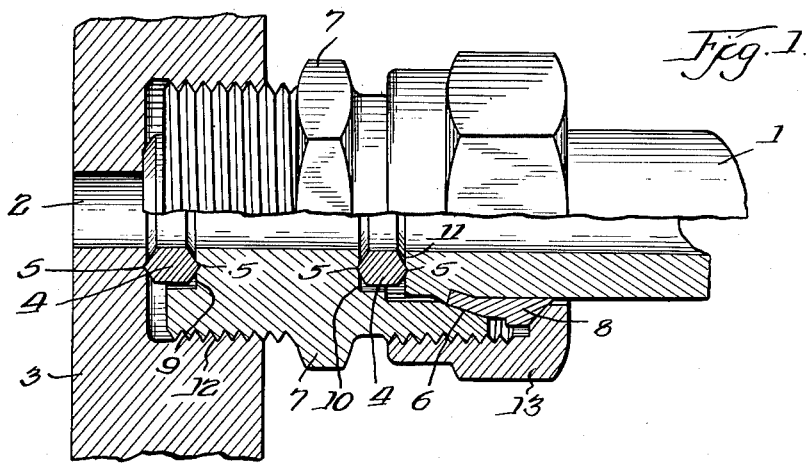
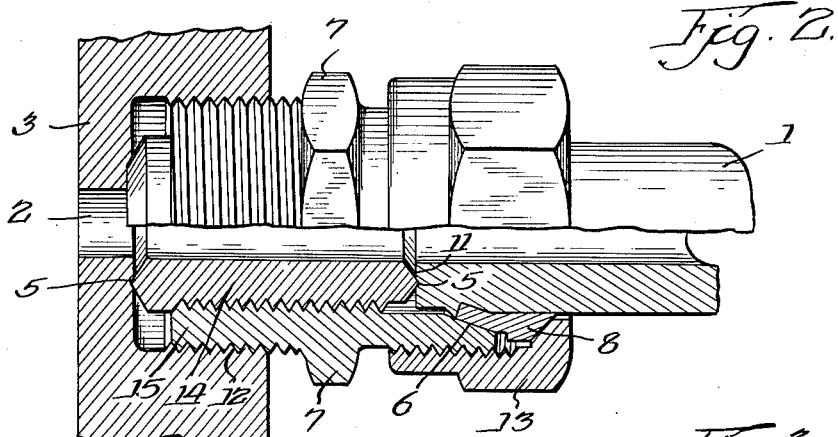
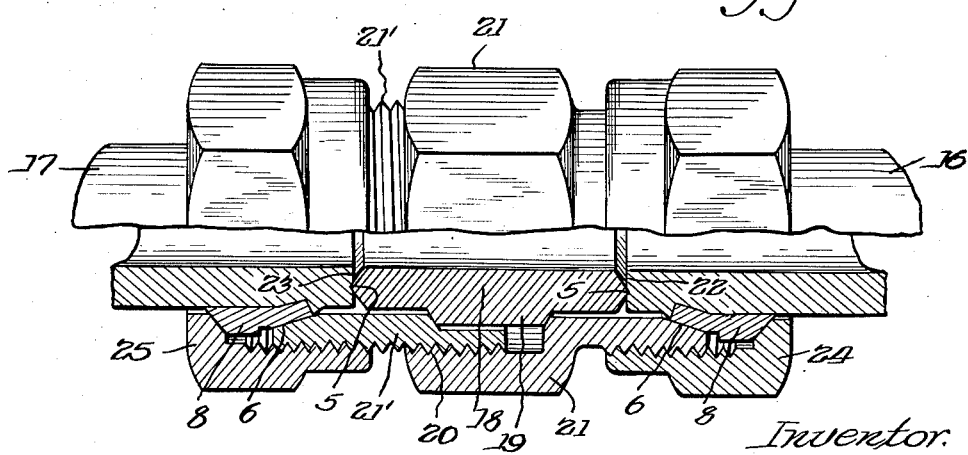
Inventor.
Hans H. Kreidel,
By
Atty.

United States Patent Office 2,761,705
Patented Sept. 4, 1956

2,761,705
PIPE COUPLING AND GASKET RING THEREFOR

Hans H. Kreidel, Wiesbaden, Germany

Application August 29, 1952, Serial No. 307,000

Claims priority, application Germany September 6, 1951

1 Claim. (Cl. 285—332)

This invention is concerned with a bushinglike gasket member for use in a pipe coupling comprising a tubular body having at opposite ends thereof surface-hardened axially outwardly pointing wedge-shaped concentric annular edges of identical diameter forming gasket seats for pressure- and liquidtight connection with elements to be coupled.

The various objects and features of the invention will appear from the detailed description which will presently be rendered with reference to the accompanying drawings, in which Fig. 1 shows an embodiment comprising a bushinglike element cooperating with two gasket rings, one at either end thereof, the gasket rings forming the seats which coact with corresponding surfaces of members to be joined; and Figs. 2 and 3 illustrate examples of embodiments in which the bushinglike element forms the gasket seats for tightening coaction with the members to be joined.

The problem in Fig. 1 is to couple the pipe 1 tightly with the wall 3 of a receptacle, tank, holder or the like having the bore 2. Two gasket rings 4, which may be made preferably of material such as stainless steel, are provided, each ring forming on each end thereof a circular or annular gasket edge 5. The two edges are along concentric circles of wedge-shaped configuration and are surface-hardened. In the wall 3 is formed a threaded recess 12 for receiving one end of the bushinglike connector element 7 which in turn is provided with a recess 9 for receiving the inner gasket ring 4. The bushinglike element 7 is tightened in place, thereby exerting pressure on the inner gasket ring 4, causing the surface-hardened edges thereof to bite into the softer material of the seat surface formed by the recess on the receptacle 3 and formed by the bottom of the recess 9 in the connector element 7, thus providing the desired high grade pressure- and liquid-tight joint between the elements to be coupled.

The opposite end, that is, the outer end, of the connector 7 forms a tubular exteriorly threaded axially directed extension or skirt, which is recessed as indicated at 10, for receiving the associated outer gasket ring 4. This outer gasket ring is structurally identical with the inner gasket ring. The inside of the tubular extension or skirt of the connector 7 is formed cone-shaped or axially outwardly widening, as shown at 6. Numeral 8 indicates a tubular gland provided at its forward or inner end with a cutting edge. This tubular gland is inserted into the gland nut 13 with its enlarged end facing into the gland nut, and both are slipped onto the pipe 1, whereupon the inner end 11 of the pipe is pressed into engagement with the outer cutting edge 5 of the outer gasket ring 4 disposed in the recess 10 of the connector 7. The gland nut 13 is thereupon tightened in threaded engagement with the tubular skirt of the connector 7. The tubular gland 8 is, incident to such tightening, advanced axially inwardly, its inner or forward portion moving into the conical bore in the skirt of the connector 7. The forward end of the gland is thereby radially inwardly contracted, causing the cutting edge thereof to bite into the pipe and to roll up some of the material of the pipe surface during further advance of the gland, the rolled up pipe material pressing radially outwardly against the inside of the tubular skirt of the connector 7 to form a tight connection therewith. The inner end 11 of the pipe 1 is in such tightening operation forced against the outer gasket ring, causing its circular hardened edge to bite into the pipe end 11 and into the bottom of the recess 10 in the bushinglike connector 7.

Fig. 2 shows an embodiment which uses for the identical purpose a coupling having a single bushinglike tubular gasket ring 14, which forms two edges 5 constituting gasket seats for tightening coaction with the bottom of the recess in the receptacle 3 and with the inner end 11 of the pipe 1, respectively. Identical numerals in Figs. 1 and 2 indicate identical parts. The connection of the pipe 1 with the axially outwardly directed extension or skirt of the connector 7 is accomplished as described in connection with Fig. 1. The connector 7 is interiorly threaded for receiving the tubular bushinglike gasket ring 14. The gasket ring is threaded into the connector 7 until the stop surfaces are in alignment and in engagement as indicated at 15. The gasket ring 14 thus forms a unitary structure, that is, a structural unit, with the connector element 7.

The assembly of the parts proceeds practically as described in connection with the embodiment shown in Fig. 1. The hardened inner edge of the gasket ring 14 will bite into the seat surface of the recess in the receptacle 3 responsive to tightening of the connector 7, and the outer edge of such gasket ring will similarly bite into the inner end 11 of the pipe 1 responsive to tightening of the gland nut 13 on the axially outwardly directed skirt of the connector 7. The gland 8 operates as in the structure, Fig. 1.

Fig. 3 shows the use of the invention in a coupling for two pipes indicated at 16 and 17. A tubular bushinglike gasket ring 18 is used in this case, which is structurally similar to the gasket ring 14 employed in Fig. 2, except that it is provided with a central enlargement 19 which projects radially outwardly from the gasket body. This enlarged central portion is held in the mounted position of the gasket ring within a recess formed in the connector 21, 21', comprising parts which are screw-connected together at 20. The tight gasket-seat connection between the two circular edges of the gasket ring 18 and the inner ends 22 and 23 of the pipes 16 and 17 is accomplished by the inward pressure exerted on the pipes responsive to the tightening of the gland nuts 24 and 25. The glands 8 operate on the pipes and coact with the associated coupling parts in a manner as already described in connection with Fig. 1. The bushinglike connector comprises in this embodiment the parts 21 which are screw-connected together as shown, each part being provided with an interiorly conical bore for coaction with the associated gland 8.

Each gasket ring forms in the corresponding structure part of the inner wall of the tubular conduit of the coupling; that is to say, it forms in any embodiment a bushinglike element of the tubular conduit formed by the coupling for conveying fluids which require the use of certain, for example, acid-, rust- or corrosionproof materials. Only the gasket rings need be made of such relatively expensive materials, for example, stainless steel, thus resulting in reduced costs. However, materials of this kind, such as stainless steel, cannot ordinarily be hardened to provide the required hard gasket edges.

The surface-hardening of the gasket edges 5 of the respective gasket rings 4, 14 and 18 may be accomplished in accordance with the process disclosed in co-pending application Serial No. 308,622, filed September 9, 1952, now abandoned. This hardening process calls for a cold hardening of the surface of the gaskets, where the gasket edges are provided, by applying to the corresponding gasket ring axial pressure forces in a suitable die device to compress the gasket material, thereby crowding and compacting it to form the hard surface thereof. The hardening is effective substantially only at the gasket edges and in the immediate neighborhood thereof, without affecting the elastic properties of the interior or intervening material of the gasket rings. The gasket rings thus exhibit very hard, biting seats or edges, but the interior remains relatively soft, therefore tough, and adapted for absorbing forces applied to the gasket rings during the tightening operations, without danger of breakage thereof. Details of the hardening process may be had from the copending application, and such details as may be pertinent to the present disclosure should be considered as if they had been included herein.

The gasket edges 5 of the respective gasket rings are concentric, of identical diameter and wedge-shaped, as shown. They are in the completed coupling firmly embedded in the associated parts thereof. They will assume their proper positions, even after loosening and reassembling or retightening a coupling. No attention need be paid, on reassembling a coupling, to place a gasket ring exactly into the position in which it was originally disposed, because the concentric form and identity of the gasket edges permits interchange without any harm. Changes may be made within the scope and spirit of the appended claims which define what is believed to be new and desired to have protected by Letters Patent.

I claim:

A device for coupling two pipes comprising a tubular sealing element disposed between the ends of the pipes to be joined and forming a conduit extending axially in series therewith, the opposite ends of said sealing element forming surface-hardened axially outwardly pointing wedge-shaped concentric annular knife edges of identical diameter which abut the corresponding pipe ends, an enlargement formed on said sealing element substantially midway thereof and projecting radially outwardly therefrom, a tubular connector surrounding said sealing element and the ends of the pipes to be joined, a substantially centrally extending annular recess formed in said connector for accommodating the enlargement of said sealing element, a conical bore formed in each end of said connector, a tubular gland for each pipe, each gland having a cutting edge formed at the leading end thereof, and a gland nut for threaded engagement with each end of said connector to drive the associated gland into the conical bore in the corresponding end of said connector so as to cause the corresponding gland to contract radially inwardly for causing the respective cutting edge to bite into the associated pipe to roll up portion of the pipe material into radial sealing engagement with the inner wall of the corresponding conical bore and for coincidentally driving the respective pipe axially inwardly into end-to-end sealing engagement with the wedge-shaped annular knife edge at the corresponding end of said gasket ring to form a seal therewith.

References Cited in the file of this patent
UNITED STATES PATENTS

| | | |
|---|---|---|
| 595,437 | Greenfield | Dec. 14, 1897 |
| 1,725,853 | Crotty | Aug. 27, 1929 |
| 1,834,581 | Ferrell | Dec. 1, 1931 |
| 2,040,766 | Chappell | May 12, 1936 |
| 2,258,528 | Wurzburger | Oct. 7, 1941 |
| 2,291,709 | Goetze | Aug. 4, 1942 |
| 2,374,138 | Sanford | Apr. 17, 1945 |
| 2,474,178 | Wurzburger | June 21, 1949 |
| 2,531,922 | Seamark | Nov. 28, 1950 |
| 2,553,981 | Richardson | May 22, 1951 |

FOREIGN PATENTS

| | | |
|---|---|---|
| 376,903 | Italy | Nov. 30, 1939 |
| 575,825 | Great Britain | Mar. 6, 1946 |